United States Patent [19]
Levy et al.

[11] Patent Number: 5,765,940
[45] Date of Patent: Jun. 16, 1998

[54] LED-ILLUMINATED STOP/TAIL LAMP ASSEMBLY

[75] Inventors: Robert Levy, Toms River; Hyman Grossman, Lambertville; Chenhua You, Manasquan; Yubo Yang, North Brunswick, all of N.J.

[73] Assignee: Dialight Corporation, Manasquan, N.J.

[21] Appl. No.: 734,138

[22] Filed: Oct. 21, 1996

Related U.S. Application Data

[60] Provisional application No. 60/008,142 Oct. 31, 1995.

[51] Int. Cl.⁶ .............. F21V 1/00; F21V 21/00; F21V 29/00; B60Q 1/00
[52] U.S. Cl. .............. 362/240; 362/61; 362/80; 362/227; 362/236; 362/237; 362/249; 362/267; 362/800
[58] Field of Search .............. 362/240, 237, 362/236, 227, 800, 61, 80.1, 244, 249, 336, 337, 267, 311, 333, 83.3, 80; 340/815.4, 815.45

[56] References Cited

U.S. PATENT DOCUMENTS

| | | | |
|---|---|---|---|
| 1,788,936 | 1/1931 | Wood | 362/333 |
| 2,568,494 | 9/1951 | Geissbuhler | 362/61 |
| 3,226,537 | 12/1965 | Hanson et al. | 362/83.3 |
| 4,298,869 | 11/1981 | Okuno | 362/800 |
| 4,591,954 | 5/1986 | Kawamura et al. | 340/815.45 |
| 4,733,335 | 3/1988 | Serizawa et al. | 362/800 |
| 4,736,279 | 4/1988 | Yamai et al. | 362/80 |
| 4,862,330 | 8/1989 | Machida et al. | 362/800 |
| 4,868,719 | 9/1989 | Kouchi et al. | 362/800 |
| 4,935,665 | 6/1990 | Murata | 362/240 |
| 4,951,179 | 8/1990 | Machida | 362/800 |
| 4,959,757 | 9/1990 | Nakata | 362/61 |
| 5,038,255 | 8/1991 | Nishibashi et al. | 362/240 |
| 5,043,716 | 8/1991 | Latz et al. | 340/815.45 |
| 5,062,027 | 10/1991 | Machida et al. | 362/800 |
| 5,121,304 | 6/1992 | Hall et al. | 362/61 |
| 5,174,649 | 12/1992 | Alston | 362/800 |
| 5,325,271 | 6/1994 | Hutchisson | 362/61 |
| 5,388,035 | 2/1995 | Bodem, Jr. | 362/240 |
| 5,438,487 | 8/1995 | Schmid et al. | 362/800 |
| 5,490,049 | 2/1996 | Montalan et al. | 362/240 |
| 5,515,253 | 5/1996 | Sjobom | 362/800 |
| 5,528,474 | 6/1996 | Roney et al. | 362/61 |
| 5,632,551 | 5/1997 | Roney et al. | 362/61 |

*Primary Examiner*—Ira S. Lazarus
*Assistant Examiner*—Matthew Spark
*Attorney, Agent, or Firm*—Oblon, Spivak, McClelland, Maier & Neustadt, P.C.

[57] ABSTRACT

The present invention relates to an LED-illuminated lamp assembly which includes a lens that is capable of directing light from the LEDs both horizontally and vertically. The taillight mode is also directed slightly upward so as to comply with applicable lighting regulations. The lamp assembly also includes a current regulating assembly which is mounted within the housing and attached to a power source for providing current to LEDs positioned within the housing. The LEDs are mounted on an LED board assembly. The current regulating assembly is capable of maintaining steady current through the LEDs independent of the power source voltage so as to prevent an overheating of the LEDs at higher than normal voltages and to provide constant, non-flickering light output with varying input voltages.

5 Claims, 5 Drawing Sheets

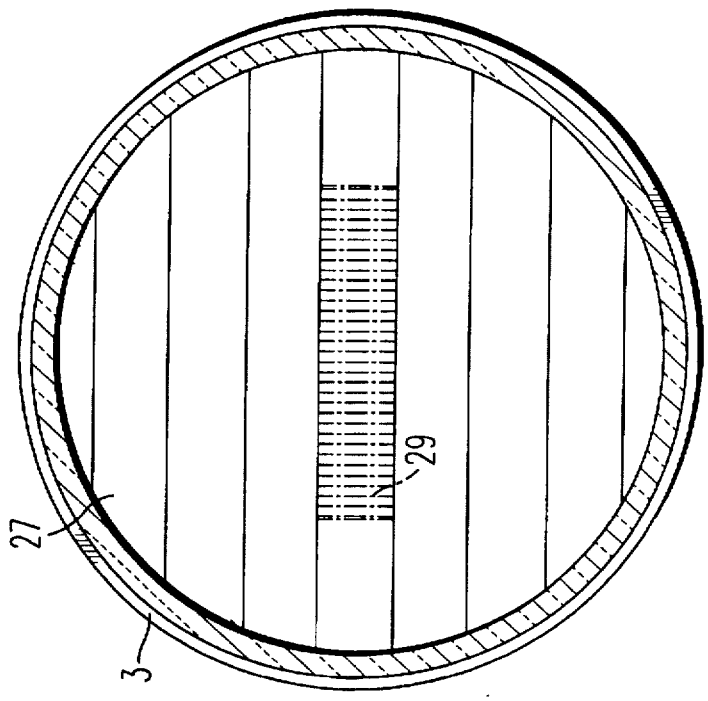
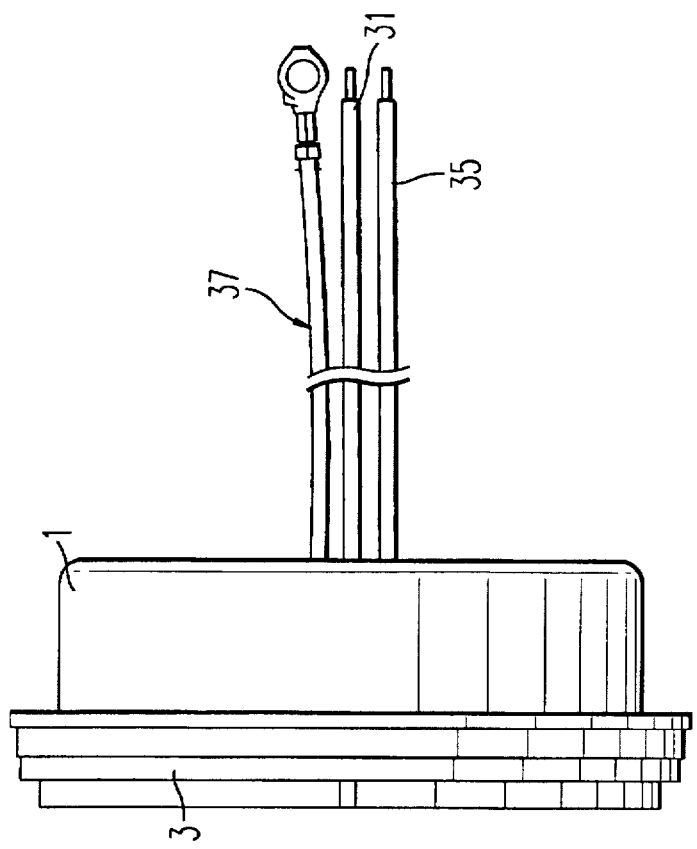

LED-ILLUMINATED STOP/TAIL LAMP ASSEMBLY

The present application is a non-provisional application which is based on U.S. provisional application Serial No. 60/008,142, filed Oct. 31, 1995, and claims the benefit of the filing date of the above-noted U.S. provisional application.

BACKGROUND OF THE INVENTION

1. Field of the Invention

The present invention relates to an LED-illuminated stop/tail light assembly which can be utilized on vehicles. The LED/tail light assembly of the present invention offers improved lighting characteristics in an efficient manner and minimizes power requirements.

2. Description of the Related Art

Generally, LEDs (light emitting diodes) offer a desirable reduction in maintenance costs when compared to incandescent lamps which burn out and require replacement. As a result of longer life spans which are attained by LEDs, it is practical to produce lamp assemblies of a sealed construction since lamp replacement is not necessary. However, there are drawbacks in utilizing LEDs where incandescent lamps have historically been used. First, conventional LEDs emit light in a relatively tight focus area requiring distribution of that light in order to attain spatial distributions in compliance with automotive DOT requirements. Additionally, LEDs are heat-sensitive devices. The heat generated during operation of the LEDs and associated current limiting must be low enough (or dissipated adequately) to assure reliable operation over automotive operating temperature ranges. Therefore, conventional illuminated stop/tail lamps which utilize LEDs may not provide adequate light intensity and may tend to overheat.

A first type of stop/tail lamp assembly which is related to the present invention includes a molded plastic housing as well as a large metal heat sink positioned inside the housing. This type of arrangement is a Trucklite product Model 44. A large metal heat sink in this assembly temporarily draws heat away from the LEDs, but this type of an arrangement does not provide an adequate heat dissipation to assure long-term reliability of operation over all of the operating temperature ranges of an automobile.

A second type of conventional device is a Grote product Model 5320 which has a metal housing and a connector on the outside of the housing. This type of assembly is filled with a potting compound which is believed to be heat conducting and used to dissipate heat to the metal housing. Both types of assemblies also use resistors for limiting current to the LEDs. However, with this arrangement, sufficient heat sinking becomes necessary to prevent damage to the LEDs over all of the operating voltage ranges of a vehicle.

Additionally, conventional stop/tail lamp assemblies do not include a theft deterrent bracket for preventing the unwanted removal of an installed assembly from a vehicle.

SUMMARY OF THE INVENTION

Accordingly, an object of the present invention is to provide for an LED-illuminated lamp assembly which overcomes the drawbacks noted above, can be used on motor vehicles, and has a lens design that, when used with selected LEDs, minimizes power requirements and subsequent heat dissipation needs.

A further object of the present invention is to provide for a lamp assembly which has a lens design which is capable of reducing dirt, oil, etc. buildup on the exterior of the lens.

A further object of the present invention is to provide for a lamp assembly which due to the use of LEDs may utilize a sealed lamp construction which is capable of remaining sealed through extreme temperature variations.

A further object of the present invention is to provide for a lamp assembly which has current regulating means which are internal to the lamp assembly and offer stable, constant intensity, flicker-free output over a wide range of operating voltages that may be present due to battery condition, wiring length, etc. The current regulation can also reduce power (heat) dissipation at higher than normal operating voltages.

A further object of the present invention is to provide for a lamp assembly which includes a theft deterrent device which can hinder the removal of the LED-illuminated stop/tail lamp assembly from a vehicle when installed on the vehicle.

Accordingly, the present invention provides for a lamp assembly which comprises a housing and an LED board assembly with a plurality of LEDs mounted therein. The LED board assembly is mounted within the housing. The lamp assembly of the present invention further comprises a current regulating assembly mounted within the housing and attached to a power source for providing current to the LEDs mounted on the LED board assembly. The current regulating assembly maintains a stable current through the LEDs regardless of the power source voltage so as to prevent an overheating of the LEDs. The lamp assembly also includes a lens mounted on an opening of the housing to enclose the housing and redistribute light which is emitted from the LEDs.

The present invention further provides for a lamp assembly which comprises a housing; an LED board assembly having a plurality of LEDs mounted thereon, the LED board assembly being mounted within the housing; and a lens mounted on an opening of the housing to enclose the housing and distribute light emitted from the LEDs. The housing comprises a recessed opening through which a power line from the power source enters the housing, and the recessed opening is filled with a potting material for sealing the opening.

The present invention also provides for a lamp assembly which comprises the housing, the LED board assembly and the lens noted above, with the lens comprising horizontally extending hyperbolic surfaces and centrally located vertically extending grooves. The vertically extending grooves direct some light from the LEDs in a horizontal and slightly upward direction.

The present invention also provides for a lamp assembly which comprises the housing, the LED board assembly and the lens noted above, as well as a theft deterrent bracket which can be attached to a rear portion of the housing for preventing a removal of the lamp assembly from a vehicle body panel on which the lamp assembly is mounted. The bracket can comprise a first portion which can be fixed to a rear of the housing, and a second portion which can be fixed to the vehicle body panel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a side view of the assembled LED-illuminated lamp assembly of FIG. 1;

FIG. 4 is an inside view of the lens arrangement of the LED-illuminated lamp assembly of FIG. 1 as looked at from the LED side;

DESCRIPTION OF THE PREFERRED EMBODIMENTS

Figure 1:
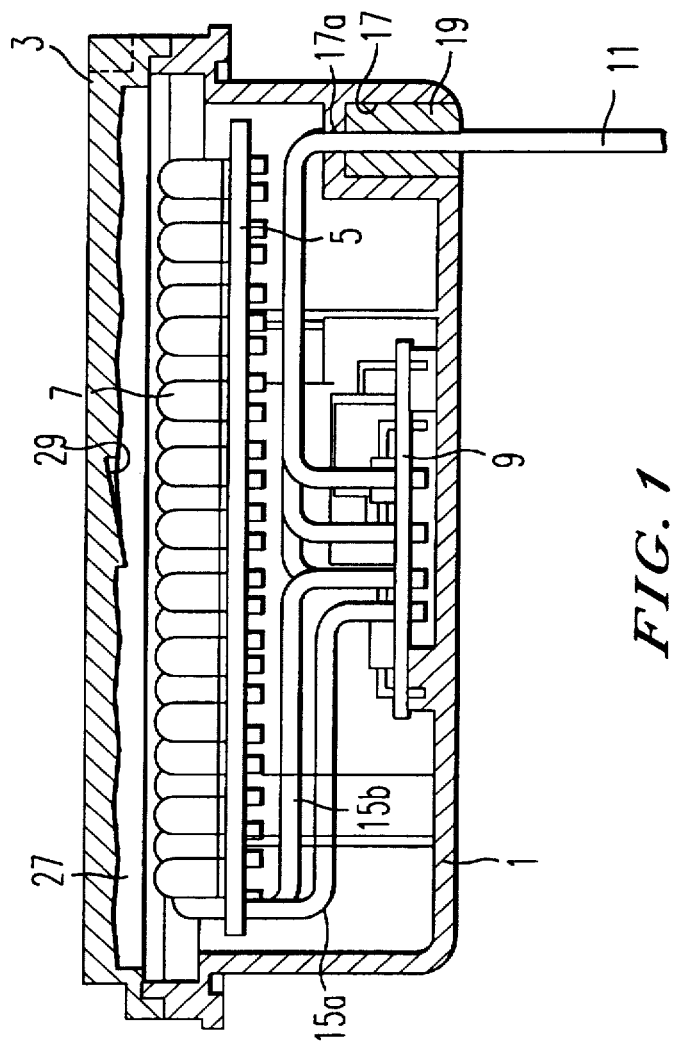
FIG. 1 is a cut-away side view of the LED-illuminated lamp assembly of the present invention.

Referring now to the drawings, wherein like reference numerals designate identical or corresponding parts throughout the several views, and more particularly to FIG. 1 thereof, FIG. 1 illustrates a cut away view of the LED-illuminated stop/tail lamp assembly of the present invention. The LED-illuminated stop/tail lamp assembly includes a housing 1 having a lens 3 attached thereon. The lens 3 can be attached to the housing 1 by way of, for example, a linear vibration weld. Mounted within the housing 1 is an LED board assembly 5 having a plurality of LEDs 7 mounted therein. The LEDs 7 are soldered to the LED board assembly 5 which is retained in the housing by way of, for example, an ultrasonic weld.

Also mounted within the housing 1 is a current regulating assembly 9. The current regulating assembly 9 can receive power from an external power source (not shown) by way of "tail" or "stop" and "common" power lines 11 and delivers current to the LED board assembly 5 and LEDs 7 by way of power lines (first and second outputs 15a, 15b). A feature of the housing 1 of the present invention is that it permits the LED board assembly 5 and the current regulating assembly 9 to be mounted one above the other in a compact manner as illustrated in FIG. 1. A further feature of the housing 1 of the present invention is that it includes a recessed opening 17 having potting material 19 positioned therein. The power lines 11 can then pass through the potting material 19 and an opening 17a positioned within the recessed opening 17. The potting material 19 serves as a sealant so as to provide for a completely sealed stop/tail lamp assembly which does not incorporate a secondary connector.

The current regulating assembly 9 serves to maintain a steady current between the power source and the LEDs 7 so as to prevent an overheating of the LEDs. Additionally, the regulating assembly maintains constant lamp intensity, independent of power supply voltage variations. The current regulating assembly 9 permits an internal current regulation and includes the first output 15a which leads from the current regulating device 9 to the LED board assembly 5, and the second output 15b which leads from the current regulating device 9 to the LED board assembly 5. The first output 15a can provide current to the majority of LEDs 7 in either of two current levels; low (for tail light mode); and high (for brake light mode). The second output 15b provides a return path for current to the regulator circuit.

Figure 3:
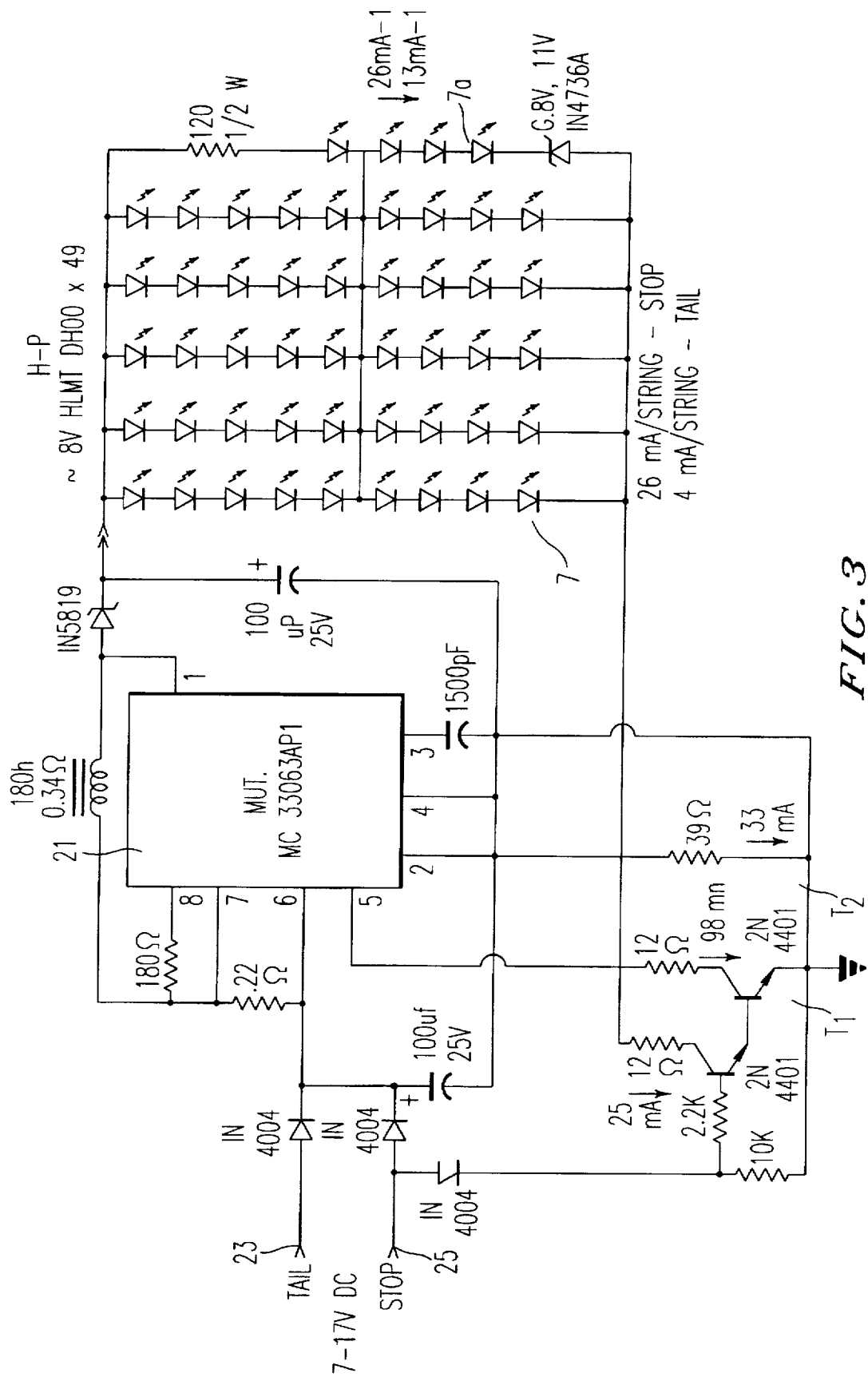
FIG. 3 is a circuit diagram for a current regulating assembly which can be utilized in the LED illuminated lamp assembly of the present invention.

FIG. 3 illustrates a more detailed description of the operation of the current regulating device 9. The circuit of the current regulating device 9 of the present invention can be based on a Motorola MC-33063A DC-DC converter IC (reference numeral 21) which is designed to regulate voltage. A low value resistor is used with the DC-DC converter to allow current sensing. The current sensing resistor value is selected to develop a 1.25 volt DC voltage at the intended LED drive current. Therefore, the current sensor resistor value is calculated as follows:

$R_S = 1.25/I_o$, where $R_S$ is the current sense resistor and Io is the desired output current;

Power dissipated in $R_S = (I_o)^2 * R_S$.

To minimize the power dissipated in $R_S$, $I_o$ needs to be kept as low as possible. For this reason, the present invention utilizes a step-up regulator configuration allowing fewer but longer strings of LEDs than would be possible when driven directly from the external power source. With 9 LEDs 7 per string, the circuit outputs 150 mA of current developing approximately 18 volts across the LED strings with better than 75% efficiency.

When a positive voltage is applied to the tail light input 23 only, both 2N4401 transistors T1, T2 are non-conducting, causing the 39 Ω resistor alone to function as $R_S$. This passes a current of approximately 33 mA through the LED board assembly. Applying the same voltage to the stop light input 25 causes both 2N4401 transistors T1, T2 to turn on, reducing the effective value of $R_S$, which increases the total current to the LED board assembly to approximately 150 mA. It is noted that the diode and resistor values illustrated in FIG. 3 are shown as examples and these values can be based on design considerations.

A sixth string 7a, or first group of 4 LEDS, in series with one, 120 Ω resistor and one 6.8 volt zener diode, runs at nearly constant brightness in both tail and stop light modes to provide high peripheral illumination. This occurs because the other five strings, or second group of LEDs function as an 18 volt reference which causes the resistors to maintain a nearly constant current through four LEDS and one zener diode. This approach provides the needed peripheral illumination while still maintaining only two wires between the current regulating assembly 9 and the LED board assembly 5.

Figure 6:
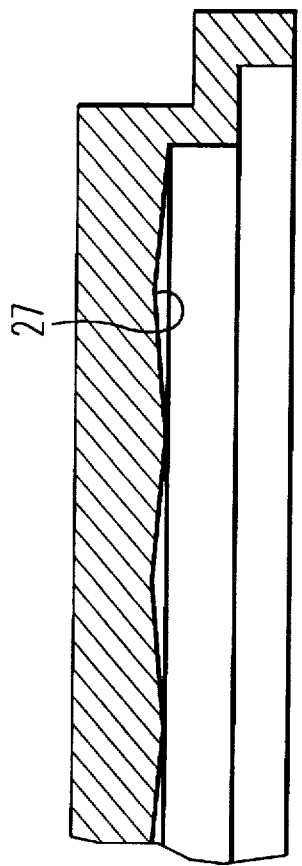
FIG. 6 is a detailed view of a portion of the lens of FIG. 5.
Figure 5:
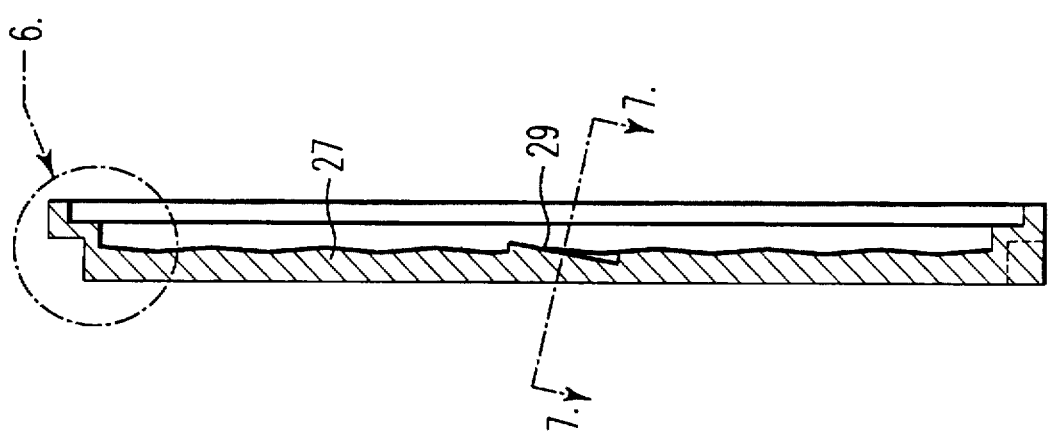
FIG. 5 is a side view of the lens of FIG. 4.

FIG. 4 illustrates an inside view of the lens 3 of FIG. 1. The lens 3 can include hyperbolic surfaces 27 which are illustrated in front view in FIG. 4 and side view in FIG. 5. FIG. 6 is a detailed view of the hyperbolic surfaces 27 illustrated in FIG. 5. The lens assembly 3 can further include vertically extending grooves 29 (prismatic lens). The vertical extending grooves 29 can be seen in detail in FIG. 7.

Figure 7:
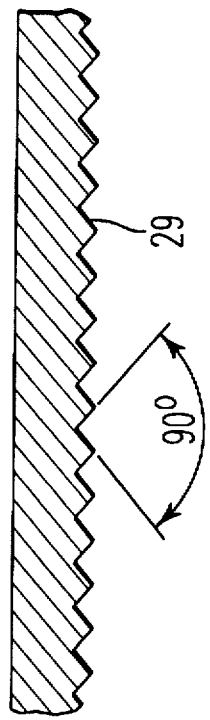
FIG. 7 is a further detailed view of a further portion of the lens of FIG. 4.

The sixth string 7a of four LEDs as illustrated in FIG. 3 are located behind the prismatic lens 29. As explained above, the sixth string 7a of four LEDs runs at nearly constant brightness in both tail and stop light modes to provide high peripheral illumination. The prismatic lens 29 as illustrated in FIGS. 4 and 7 is utilized to divert some of the light from the LEDs horizontally. With the combination of the prismatic lens 29 and the hyperbolic surfaces 27, it is possible to divert the light from the LEDs horizontally and slightly upward so as to better comply with applicable lighting regulations.

Also, as illustrated in FIG. 1, the hyperbolic surfaces 27 and the prismatic lens 29 of the lens assembly 3 are positioned on an interior surface so as to reduce dirt and oil buildup on the lens exterior.

FIG. 2 illustrates a side view of the stop/tail lamp assembly of FIG. 1 which illustrates the housing 1 and lens assembly 3. As illustrated in FIG. 2, with the specific current regulating and circuit arrangement illustrated in FIGS. 1 and 3, the present invention only requires a tail lamp power input 31, a stop lamp power input 35, and a ground wire 37.

Figure 8B:
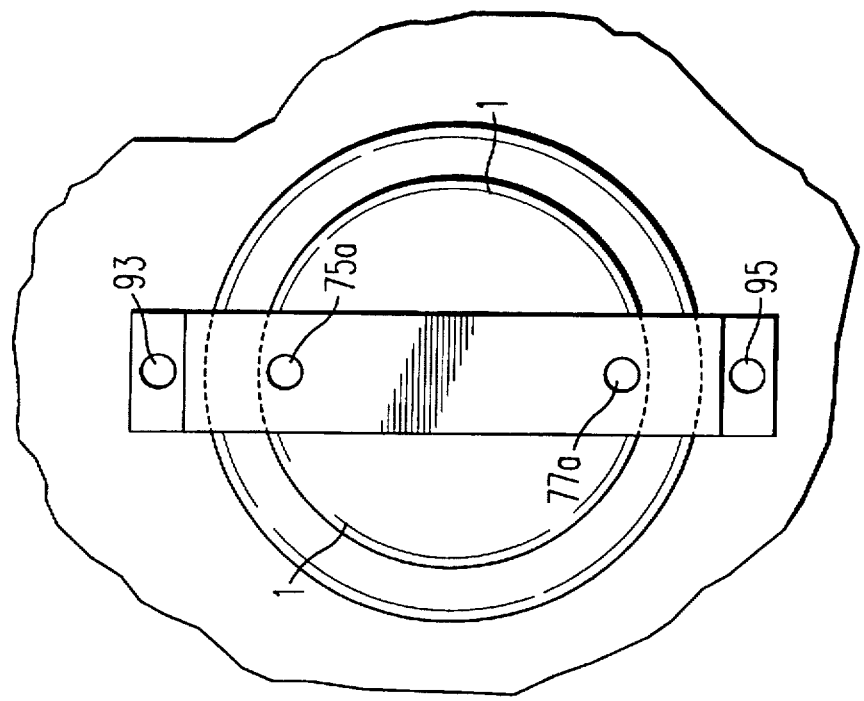
FIGS. 8(a) and 8(b) illustrate a side view and a rear view of the LED illuminated lamp assembly of FIG. 1 with a theft-deterrent bracket attached thereto.
Figure 8A:
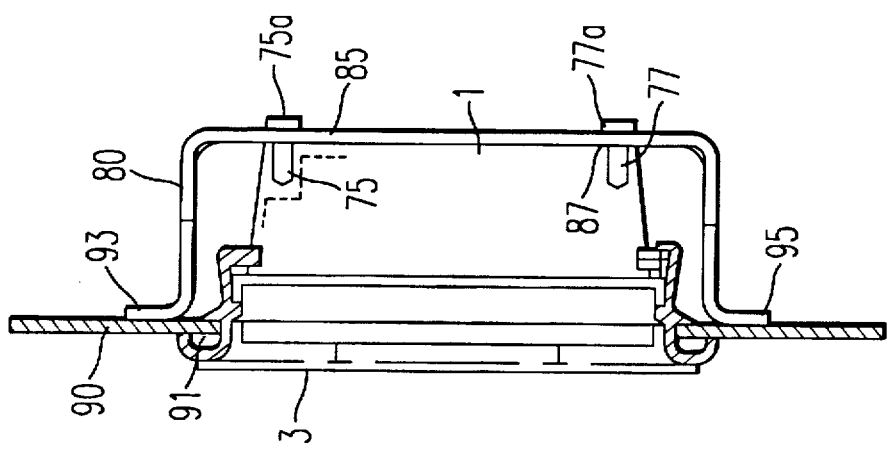

FIGS. 8(a) and 8(b) illustrate a theft deterrent bracket which can be utilized with the stop/lamp assembly of the present invention. As illustrated in FIG. 8(a) which is a side view of the assembly, a theft deterrent bracket 80 can be inserted on the backside of the housing 1. The housing 1 can include bores 75, 77 which cooperate with corresponding bores 85 and 87 on the theft deterrent bracket 80. With this arrangement, the stop/tail light assembly can be inserted in the opening of a typical vehicle panel 90 of a vehicle as illustrated in FIG. 8(a), such that mounting grommets 91 positioned on the periphery of the stop/lamp assembly can abut against the panel 90. The user can then utilize the space behind the panel 90 to attach the bracket 80 to the back of the housing 1 by aligning the bracket 80 to the back of the housing 1 such that the bores 85, 87 of the bracket 80 are aligned with the bores 75, 77 of the housing 1. Thereafter, screws 75a, 77a which can be anti-reversal screws, are inserted within the aligned bores so as to attach the bracket 80 to the housing 1. The arrangement in FIGS. 8(a) and 8(b) can prevent an individual from pulling the stop/lamp assembly from the panel due to the presence of the bracket 80.

It is noted that the mounting grommet 91 can prevent an individual from pushing the stop/tail lamp assembly to the interior of the panel to prevent the unwanted removal of the panel. However, as an added feature, the bracket 80 can include bores 93, 95 which can cooperate with associated bores on the vehicle body panel 90 to permit the bracket 80 to be attached to the vehicle body panel 90 at these points by inserting screws into the bores 93, 95. FIG. 8(b) which shows a rear view of the stop/lamp assembly of the present invention shows a circular lamp. However, it is recognized that the theft deterrent bracket can also be utilized with lamps of various shapes such as oval lamps.

Thus, the present invention provides for an LED illuminated lamp arrangement which utilizes LEDs which provide for an increased service life and thus reduces maintenance costs. The lens 3 of the present invention includes the hyperbolic surfaces 27 which can focus light vertically and the prismatic lens 29 which can direct some light from the LEDs horizontally and slightly upward. This enables the lamp assembly of the present invention to comply with applicable regulations.

Additionally, with the current regulating device 9, it is possible to ensure a constant current supply to the LEDs independent of voltage variations of the power source thus preventing the overheating of the LEDs at high supply voltages and insufficient illumination at low supply voltages. The current regulating assembly 9 has first and second outputs 15a, 15b. The first output 15a provides current to the majority of the LEDs in either a low current level for the tail-light mode or a high current level for a brake light mode. The second output 15b provides a current return path to the current regulating assembly. The current regulating assembly 9 provides for steady current to the LEDs so as to assure constant non-flickering reliable operation over the entire operating supply voltage and temperature range of a vehicle.

Also, the recessed opening 17 including the potting sealing material 19 enables the entire assembly to be completely sealed.

Additionally, the present invention provides for a theft deterrent bracket which is attached to the back of the housing so as to reduce the likelihood of theft.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A lamp assembly comprising:

a housing:

an LED board assembly having a plurality of LEDs mounted thereon, said LED board assembly being mounted within said housing;

a current regulating assembly having a single circuit which provides one of a high current level and a low current level mounted within said housing and on a wall of said housing so as to be positioned between said LED board assembly and said wall, said current regulating assembly being attached to a power source for providing current to the LEDs mounted on the LED board assembly, wherein said current regulating assembly provides constant current to the LEDs independent of voltage variation of the power source so as to prevent overheating of the LEDs at high supply voltages and insufficient illumination at low supply voltages, said plurality of LEDs including a first group of LEDs providing a nearly constant illumination level at both the high and low current levels and a second group of LEDs providing a substantially increased illumination level in response to the high current level, and wherein said current regulating assembly comprises a first output which provides current to said plurality of LEDs in either the low current level for a tail light mode or the high current level for a brake light mode, and a second output which provides a return path for the current to the current regulating assembly; and a lens mounted on an opening of said housing to enclose said housing and distribute light emitted from the LEDs.

2. A lamp assembly according to claim 1, wherein said housing comprises a recessed opening through which a power line from the power source enters said housing, said recessed opening being filled with a potting material for sealing said recessed opening.

3. A lamp assembly according to claim 1, wherein said lens comprises bands of hyperbolic surfaces which extend in a first direction and centrally located grooves which extend in a second direction substantially perpendicular to the first direction, said grooves directing some light from said LEDs in a horizontal and slightly upward direction.

4. A lamp assembly according to claim 1, further comprising a theft deterrent bracket attached to a portion of said housing opposite said opening for preventing a removal of the lamp assembly from a vehicle body panel on which the lamp assembly is mounted.

5. A lamp assembly according to claim 1, further comprising a theft deterrent bracket for preventing a removal of the lamp assembly from a vehicle body panel on which the lamp assembly is mounted, said bracket comprising a first portion which can be fixed to a portion of the housing opposite said opening, and a second portion which can be fixed to the vehicle body panel.

* * * * *